Nov. 20, 1923.
M. PINKOSH
1,474,640
DEVICE FOR TREATING PIE DOUGH
Filed April 3, 1922     2 Sheets-Sheet 1
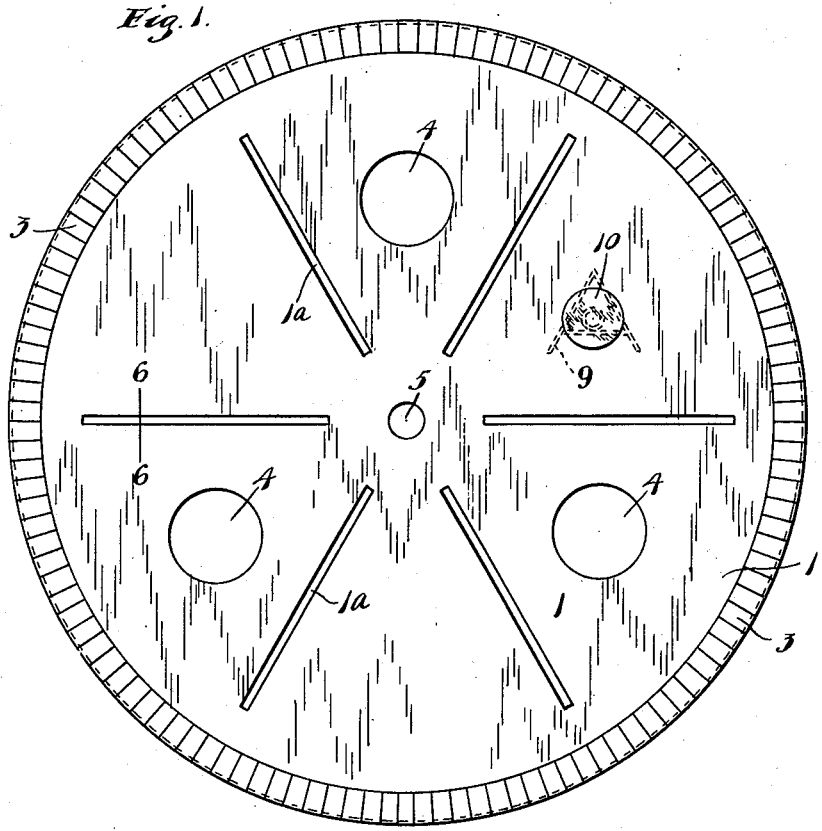
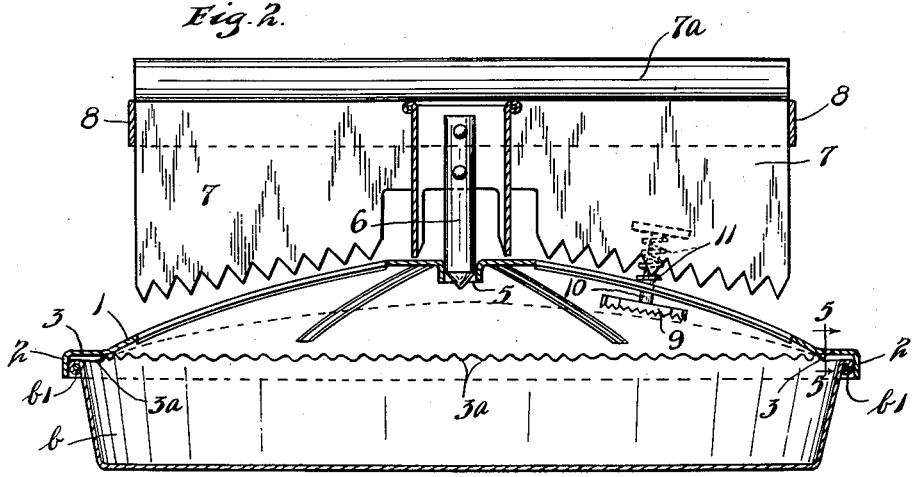
INVENTOR.
MICHAEL PINKOSH
BY HIS ATTORNEY.
James F. Williamson Nov. 20, 1923.  1,474,640
M. PINKOSH
DEVICE FOR TREATING PIE DOUGH
Filed April 3, 1922    2 Sheets-Sheet 2
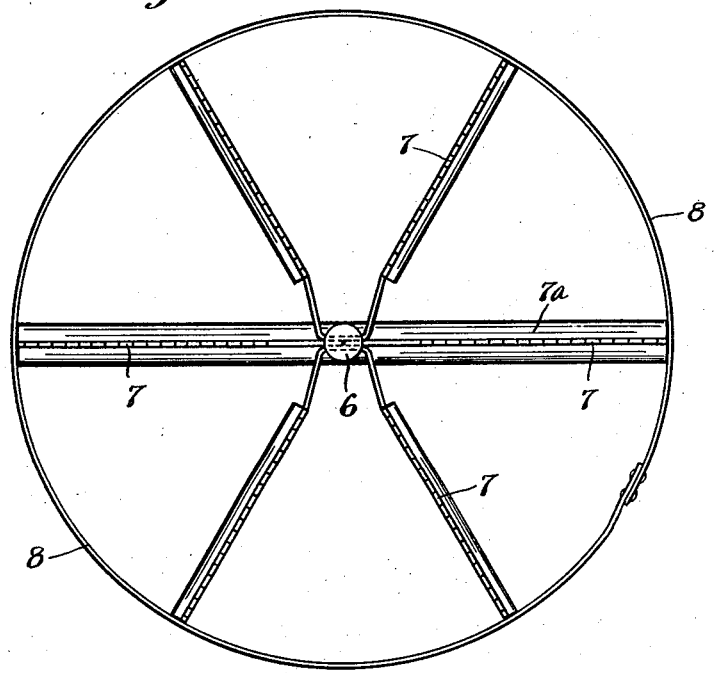
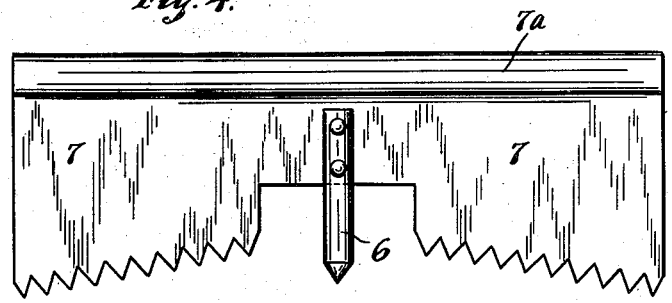
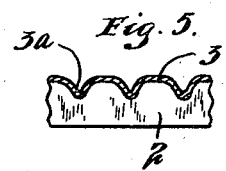
INVENTOR.
MICHAEL PINKOSH.
BY HIS ATTORNEY.
James F. Williamson Patented Nov. 20, 1923.

1,474,640

UNITED STATES PATENT OFFICE.

MICHAEL PINKOSH, OF MINNEAPOLIS, MINNESOTA, ASSIGNOR OF ONE-HALF TO JOHN PASEKA, OF MINNEAPOLIS, MINNESOTA.

DEVICE FOR TREATING PIE DOUGH.

Application filed April 3, 1922. Serial No. 549,233.

*To all whom it may concern:*

Be it known that I, MICHAEL PINKOSH, a citizen of the United States, residing at Minneapolis, in the county of Hennepin and State of Minnesota, have invented certain new and useful Improvements in Devices for Treating Pie Dough; and I do hereby declare the following to be a full, clear, and exact description of the invention, such as will enable others skilled in the art to which it appertains to make and use the same.

This invention relates to a device for operating on pies. In commercial bakeries and other places where pies are made it is customary to trim the edge of the pie about the outside of the pie pan after the dough has been placed in the pan and the cover, if used, placed thereon. This trimming operation has usually been performed with a knife which was passed around the edge of the pan. It has also been the practice in making covered pies to form several holes in the top thereof through which the steam and gases generated in the baking operation issue.

It is an object of this invention to provide a simple device having means thereon by which the pie can be trimmed with one simple motion thereof.

It is another object of the invention to also provide the device with a crimping and sealing means for the pie which will be operated during the same motion used for the trimming.

It is still another object of the invention to provide the device with means for piercing the top of the pie in such a manner that the desired vents will be formed and at the same time the pieces into which the pie is subsequently to be cut will be marked.

It is still a further object of the invention to provide the device with means for marking the pie to designate the nature thereof.

These and other objects and advantages of the invention will be fully set forth in the following description made in connection with the accompanying drawings in which like reference characters refer to the same parts throughout the different views, and in which, Fig. 1 is a plan view of a portion of the device;

Fig. 2 is a vertical central section of the device;

Fig. 3 is a bottom plan view of a piercing and marking means;

Fig. 4 is a view in side elevation of the same;

Fig. 5 is a vertical section taken on the line 5—5 of Fig. 2 shown on an enlarged scale; and Fig. 6 is a vertical section taken on the line 6—6 of Fig. 1.

Referring to the drawings, a pie pan $b$ is shown having the usual projecting top edge portion $b^1$. The crust for the pie is usually placed in such a pan and extends over the said edge and if a cover is used on the pie, this also extends over the edge on top of the bottom portion.

In accordance with this invention, a plate 1 is provided of semi-cylindrical shape having an open ended edge forming a cylindrical portion 2 around its outer side. This portion is connected to the curved portion by an inwardly projecting portion 3 extending substantially at a right angle to the portion 2 and being formed with teeth or corrugations $3^a$ therein extending radially from the center of the plate. These corrugations, as shown in Fig. 2, are preferably formed of greater depth at the inner portion of the member 3 than at the outer portion thereof. The plate 1 is provided with a plurality of radial slots $1^a$, these being shown as six in number. A plurality of circular holes 4 are shown passing through the plate between certain of said slots. The slots $1^a$ are preferably formed by bending or punching in the material of the plate, as illustrated in Fig. 6, the down-turned sides of the material forming a guiding means for a purpose later described. The plate 1 is also formed at its center with a sleeve portion 5 which forms the guiding means for a spindle or plunger 6. This plunger has riveted, or otherwise suitably secured thereto, a plurality of radial blade forming plates 7 having serrations on their bottom edges, which plates are of greater width at their outside edges than at the inner portions thereof, so that the serrated edge slants in substantially the same degree as the top of the pie. One of the plates 7 is formed into cylindrical shape $7^a$ at its top to form a handle and a band 8 passes around the top of said plates to hold the same in proper spaced relation.

The plate 1 has extending therethrough between adjacent slots 1ª a marking device comprising a pie engaging head 9 carried on a headed plunger 10 which is held in elevated position by a coiled spring 11 surrounding said plunger and bearing against the head thereof at one end and against the plate 1 at its other end. The portion 9 of the marking device, as illustrated, is formed as the letter A, designating an apple pie. The said head portion 9 will take various shapes to mark the various kinds of pies.

In operation, after the pie is made, the member 1 will be placed over the same, as shown in Fig. 2 and as the edge of the portion 2 passes down around the edge of the pie pan the projecting portions of dough will be trimmed off, the pan and the portion 2 acting as a die and plate. As the cover is pressed down on the pie the toothed or corrugated portion 3 will press the cover of the pie down upon the bottom thereof about the edge of the pan and the pie will be effectively crimped and sealed. The handle 7ª is then grasped and the blade 7 pushed down through the slots 1ª, the sides of which form convenient guiding means for said plates. The sleeve 5 also acts as a piercing and guiding means for the plunger 6. The top of the pie will thus be pierced by the points on said plates. The necessary vents will not only be formed in the top of the pie, but the same will be marked to indicate the lines of cut for the pieces into which the pie is to be subsequently divided. The pie will not only be marked for such pieces but the crust will be prepared to facilitate the cutting operation. It often happens that in cutting pies the crust will break under pressure of the knife instead of being cut. This tendency is eliminated by the action of the serrated blades 7.

In restaurants, it is often necessary for the operator to lift a portion of the crust to ascertain the nature of the pie and by the provision of the marking device comprising the member 9, the contents of the pie will be clearly marked on the top thereof and it will thus be unnecessary to mutilate the pie to determine its nature. The number of slots 1ª can, of course, be varied to suit conditions. There are, however, certain standard sizes of pans and it is customary in restaurants to divide a certain size of pie into a determined number of pieces.

The device, while particularly adapted for use in bakeries where a large number of pies are made will also have great utility for home baking. The pie can be trimmed and sealed, as described and the cover plate 1 often left on the pie during the baking operation. In a great many cases the pie is burned on the top and under-done at the bottom. The cover 1 will tend to equalize the baking heat throughout the pie and the same will be brought to a uniform baked condition. The condition of the pie can be readily perceived through the openings 4.

From the above description it is seen that applicant has provided a simple and efficient device for operating on pies. The same is preferably made of sheet material and is not only simple and inexpensive but can be readily cleaned and kept in a sanitary condition.

It will, of course, be understood that various changes may be made in the form, details, arrangement and proportions of the parts without departing from the scope of applicant's invention, which, generally stated, consists in the matter shown and described and set forth in the appended claims.

What is claimed is:

1. A device for treating pie dough in the pie pan comprising, a rigid member constructed to extend over a pie and having an open cylindrical portion, the edge of which is adapted to press down around the pie pan and sever the projecting portion of the dough, said member also having a continuous corrugated flange portion adapted to seal and crimp the edge of the dough by the same downward movement that severs the projecting portion.

2. A device for treating pie dough in the pie pan comprising, a substantially rigid member adapted to extend above and entirely around the edge of the pie dough and pie pan, said member having a cylindrical edge adapted to sever the edge of the dough projecting over the pan and having an inwardly extending corrugated crimping and sealing flange, the portion of the member extending above the dough having spaced radial slots therein, and a member for marking and venting the top of the dough having blades insertable through the said slots.

3. A device for treating pie dough in the pie pan having in combination, a member extending over the dough in a pie pan above the same having a plurality of radial slots formed therethrough, and a plurality of blades having serrated lower edges adapted to reciprocate in said slots to pierce the top of the dough and to indicate the pieces into which the pie is to be cut.

4. The structure set forth in claim 3, and a guiding means in said plate and a guide carried by said blades and co-operating with said means.

5. A device for treating pie dough in the pie pan having in combination a member adapted to be supported at the edge of the dough and to extend over the same, said member having a plurality of radial slots formed therethrough, and a central sleeve formed therein, a device comprising a plurality of radial blades having a central plunger adapted to co-operate with said member, said blades adapted to pass through said slots, and said plunger adapted to be received in said sleeve, and a handle member formed on said last mentioned device.

6. A device for operating on pies having in combination, a substantially rigid member constituting a trimming means for the edge of the dough, sealing and crimping means for said edge, a movable piercing and marking means for the top of the dough movable through apertures in said member, and spring controlled means on said member for indicating the contents of the pie.

7. A device for trimming and corrugating pie dough while in the pan, comprising an integral structure adapted to be moved downwardly over the pan and provided with means to cut away the dough projecting over the edge of the pan by said downward movement, and with additional means to simultaneously corrugate the periphery of the dough.

8. A device for simultaneously trimming and corrugating pie dough while in the pan, comprising an integral structure adapted to be pressed downwardly over the edge of the pan, and provided with means to cut away the dough projecting over such edge by said downward movement with additional means for suitably corrugating the outer periphery of said dough and also provided with openings whereby the device may be grasped by the fingers of the operator.

In testimony whereof I affix my signature.

MICHAEL PINKOSH.